US012666514B2

(12) United States Patent
Ke et al.

(10) Patent No.: US 12,666,514 B2
(45) Date of Patent: Jun. 23, 2026

---

(54) NON-MOBILE INDOOR LIGHT-EMITTING DIODE (LED) EMERGENCY LIGHT IN COORDINATION WITH LONG RANGE (LORA) GATEWAY

(71) Applicant: Zhejiang Ment Lighting Co., Ltd, Shaoxing (CN)

(72) Inventors: Jianfeng Ke, Shaoxing (CN); Junmin Lu, Shaoxing (CN)

( * ) Notice: Subject to any disclaimer, the term of this patent is extended or adjusted under 35 U.S.C. 154(b) by 92 days.

(21) Appl. No.: 18/830,602

(22) Filed: Sep. 11, 2024

(65) Prior Publication Data

US 2024/0431003 A1 Dec. 26, 2024

Related U.S. Application Data

(63) Continuation of application No. PCT/CN2024/079733, filed on Mar. 1, 2024.

(30) Foreign Application Priority Data

Jun. 16, 2023 (CN) .......................... 202310719670.8

(51) Int. Cl.
*H05B 45/50* (2022.01)
*F21V 3/06* (2018.01)
(Continued)

(52) U.S. Cl.
CPC ............. *H05B 45/50* (2020.01); *F21V 3/062* (2018.02); *F21V 29/70* (2015.01); *H02J 9/065* (2013.01);
(Continued)

(58) Field of Classification Search
CPC ........ H05B 45/50; H05B 45/34; H05B 47/19; H05B 45/30; F21V 3/062; F21V 29/70;
(Continued)

(56) References Cited

U.S. PATENT DOCUMENTS 9,686,842 B1 * 6/2017 Coombes ............... H05B 45/24
2019/0320515 A1 * 10/2019 Sadwick ................... F21K 9/27

FOREIGN PATENT DOCUMENTS

CN 102042551 A 5/2011
CN 205504562 U 8/2016
(Continued)

OTHER PUBLICATIONS

Du Shao-Wu, et al., Design of Modbus—based Intelligent Emergency Luminary, Communications Technology, 2010, pp. 155-157, 160, vol. 43 No. 12.
(Continued)

*Primary Examiner* — Minh Tran

(57) ABSTRACT

A non-mobile indoor light-emitting diode (LED) emergency light in coordination with a long-range (LoRa) gateway includes an alternating-current (AC) control device, an emergency control device, a light source assembly, a battery, an auxiliary control board, and a power input interface, where a transistor circuit controlled by a pin of a chip of a microcontroller circuit is provided between an output terminal of the AC control device and an LED load; during emergency testing, the output terminal of the AC control device is disconnected from the LED load; the light source assembly includes a lampshade, an LED light source module, and a heat sink; the power input interface is formed by lamp caps at two ends, and is configured with the AC control device and the emergency control device; the lampshade and the heat sink are coordinated with the LED light source assembly.

20 Claims, 10 Drawing Sheets

(51) Int. Cl.

| | | |
|---|---|---|
| *F21V 29/70* | (2015.01) | |
| *H02J 9/06* | (2006.01) | |
| *H05B 45/34* | (2020.01) | |
| *H05B 47/19* | (2020.01) | |
| *F21Y 115/10* | (2016.01) | |

(52) U.S. Cl.
CPC ............. *H05B 45/34* (2020.01); *H05B 47/19* (2020.01); *F21Y 2115/10* (2016.08)

(58) Field of Classification Search
CPC ...... H02J 9/065; F21Y 2115/10; G08C 17/02; H04Q 9/00
See application file for complete search history.

(56) References Cited

FOREIGN PATENT DOCUMENTS

| | | |
|---|---|---|
| CN | 205648069 U | 10/2016 |
| CN | 111263485 A | 6/2020 |
| CN | 210781460 U | 6/2020 |
| CN | 217690440 U | 10/2022 |
| CN | 116744504 A | 9/2023 |
| CN | 220139777 U | 12/2023 |
| JP | 2005038754 A | 2/2005 |
| JP | 2009146714 A | 7/2009 |
| JP | 3209183 U | 3/2017 |

OTHER PUBLICATIONS

Li Wen-Xiang, et al., Controlling system fbr intelHgent emergency lights based on Zigbee network, Joumal of Southwest Minzu university(Natural Science Edition), 2017, pp. 291-297, vol. 43 No.3.

Kong Yun-Ke, Application of Internet of things in intelligent evacuation indication sign, Fire Science and Technology, 2017, pp. 1158-1160, vol. 36 No. 8.

* cited by examiner

NON-MOBILE INDOOR LIGHT-EMITTING DIODE (LED) EMERGENCY LIGHT IN COORDINATION WITH LONG RANGE (LORA) GATEWAY

CROSS REFERENCE TO THE RELATED APPLICATIONS

This application is the continuation application of International Application No. PCT/CN2024/079733, filed on Mar. 1, 2024, which is based upon and claims priority to Chinese Patent Application No. 202310719670.8, filed on Jun. 16, 2023, the entire contents of which are incorporated herein by reference.

TECHNICAL FIELD

The present disclosure relates to a light-emitting diode (LED) emergency light with a long-range (LoRa) module circuit as a communication module. The LoRa module circuit coordinates with a LoRa gateway to achieve various emergency operations, such as emergency testing and processing of automatic emergency test result data.

BACKGROUND

As a type of emergency light, LED emergency lights need to undergo emergency testing based on current regulations to determine whether they can switch to emergency operation in case of a power failure.

According to the search results, current LED emergency lights have a single function and lack a communication function, making them fail to meet the networking management function. In addition, LED emergency testing adopts a system integration design and lacks a manual testing mode, so the testing method cannot be adjusted according to the usage scenario.

SUMMARY

An objective of the present disclosure is to provide a non-mobile indoor light-emitting diode (LED) emergency light in coordination with a long range (LoRa) gateway. The present disclosure solves the technical problem of redesigning the structure and circuit of the emergency light such that the LED emergency light has networking system management and manual testing functions.

A non-mobile indoor light-emitting diode (LED) emergency light in coordination with a long-range (LoRa) gateway includes an alternating-current (AC) control device, an emergency control device, a light source assembly, a battery, an auxiliary control board, and a power input interface, where a transistor circuit controlled by a pin of a chip of a microcontroller circuit is provided between an output terminal of the AC control device and an LED load; during emergency testing, the output terminal of the AC control device is disconnected from the LED load; the AC control device, the emergency control device, the battery, and the auxiliary control board are all configured with the light source assembly; the emergency control device is provided with a constant-voltage drive circuit, an emergency operating circuit, the microcontroller circuit, and a LoRa module circuit; the constant-voltage drive circuit is configured to charge the battery and provide power to a microcontroller in the microcontroller circuit and the LoRa module circuit during normal power supply; the emergency operating circuit is powered by the battery to operate; the microcontroller of the microcontroller circuit is configured to control a pin to output a high level to a pin DIM of a chip of the emergency operating circuit, allowing the LED load of a light source to operate in an emergency state; when the microcontroller circuit is under normal power supply, the constant-voltage drive circuit outputs a voltage, and a voltage regulator chip of the microcontroller circuit outputs a 3.3 V voltage for power supply; during emergency operation, the battery generates a 3.3 V voltage through the voltage regulator chip of the microcontroller circuit for power supply; among pins used by the microcontroller of the microcontroller circuit, two pins serve as 3.3 V power supply pins for the microcontroller; two pins, as data transmission and reception pins TXD and RXD of a serial interface, are respectively connected to pins RXD and TXD of the LoRa module circuit, achieving transparent data transmission with the LoRa module circuit; a pin serves as a control pin for an indicator light, and is connected to the indicator light of the auxiliary control board; an input/output (I/O) pin of the microcontroller is configured to output signals, causing the LED indicator light to display different operating states; a pin serves as a trigger pin for a test button, and is connected to the test button of the auxiliary control board; the I/O pin of the microcontroller is configured to receive a trigger signal from the test button; a pin is configured to connect or disconnect the output terminal of the AC control device and the load; during normal power supply, the pin outputs a high level to a base of a transistor Q6, causing the transistor Q6 to be on; a voltage LED1+ output by the AC control device is applied to a gate and a source of a transistor Q5 through voltage division by R18, causing the transistor Q5 to be on; a voltage output by the AC control device is applied to the LED load LED+, causing the LED load to operate normally; during emergency testing, the pin outputs a low level to the base of the transistor Q6, causing the transistor Q6 to be off; the voltage LED1+ output by the AC control device to the gate and the source of the transistor Q5 is lost through voltage division by R18, causing the transistor Q5 to be off; a voltage output by the AC control device is disconnected from the LED load LED+; a pin serves as an emergency operation control pin; during normal power supply, the pin outputs a high level to a base of a transistor Q3, causing the transistor Q3 to be on; a voltage output by the constant-voltage drive circuit is applied to a gate and a source of a transistor Q4 through voltage division by R13, causing the transistor Q4 to be on; the constant-voltage drive circuit outputs a voltage to charge the battery (4); when the battery is charged to a certain value, the pin outputs a low level to the base of the transistor Q3, causing the transistor Q3 to be off; the voltage output by the constant-voltage drive circuit to the gate and the source of the transistor Q4 is lost through voltage division by R13, causing the transistor Q4 to be off, such that the charging of the battery 4 by the voltage output by the constant-voltage drive circuit stops; a pin serves as an operating voltage detection pin for the LED load, and is configured to acquire operating voltage information of the LED load by resistor division sampling on the voltage of the LED load as a basis for determining whether the emergency operates normally; a pin serves as a voltage detection pin for the built-in battery, and acquires voltage information of the battery through resistor division sampling on a voltage of the battery as a basis for determining whether emergency charging, emergency operation, and emergency testing conditions are met; a pin serves as a normal power supply detection pin; during normal power supply, the emergency drive circuit operates and outputs a voltage, causing a transistor Q2 to be on; the detection pin is pulled down to generate a low-level signal; the LoRa module circuit performs transparent data transmission with the serial interface of the microcontroller circuit; the LoRa module circuit is connected to a spring antenna on the auxiliary control board through a communication line to achieve LoRa wireless communication of data and instructions with a LoRa gateway; the auxiliary control board is provided with a toggle switch, the indicator light, the button, and the antenna; the toggle switch is coordinated with the battery to disconnect and connect the battery; the indicator light is configured to display an operating mode and an automatic testing state of the light; the button is configured for emergency manual testing; when the test button is pressed several times within set seconds, the emergency light performs set seconds of automatic emergency testing; when the test button is pressed several times within set seconds, the emergency light performs set minutes of automatic emergency testing; during any manual testing process, when the test button is pressed several times, an automatic testing control system terminates manual testing; and when the test button is pressed and held for set seconds for reset, timing of an automatic testing program is reset to zero.

A coordination relationship between the LoRa module circuit and the LoRa gateway in terms of quantity is N:1, N≤200.

When the test button is pressed once within 3 seconds, the emergency light performs 30 seconds of automatic emergency testing; when the test button is pressed twice within 3 seconds, the emergency light performs 90 minutes of automatic emergency testing; during any manual testing process, when the test button is pressed once, the automatic testing control system terminates manual testing; and when the test button is pressed and held for 5 seconds for reset, timing of the automatic testing program is reset to zero.

The LoRa gateway stores test result information, and saves the test result information to a database through a computer terminal; and the LoRa module circuit receives a 30-second or 90-minute emergency function testing instruction from the LoRa gateway, performs real-time emergency function testing, and uploads a test result in real time.

The indicator light is configured to display the operating mode and the automatic testing state of the emergency light, specifically:
    a. when the indicator light is always on, the indicator light indicates normal power supply and normal testing;
    b. when the indicator light is off, the indicator light indicates a power failure;
    c. when the indicator light is in a slow flash mode 1, on for 1 second/off for 0.3 seconds, lasting for 15 seconds, the indicator light indicates that the built-in battery is not fully charged or not suitable for manual testing;
    d. when the indicator light is in a slow flash mode 2, on for 1 second/off for 3 seconds, the indicator light indicates emergency testing under progress; and
    e. when the indicator light is in a quick flash mode, on for 0.5 seconds/off for 0.5 seconds, the indicator light indicates abnormal testing.

The antenna is the spring antenna configured for signal transmission and reception of the LoRa module circuit.

The transistor circuit is controlled by a pin 10 of the microcontroller of the microcontroller circuit; and an I/O pin 11 is configured to output a high level to the pin DIM of the emergency control circuit chip.

The LoRa gateway includes a wireless communication module, a chip, and a data storage unit; the wireless communication module corresponds to the LoRa module circuit;

the LoRa gateway communicates wirelessly with the emergency light to achieve data upload and download; and the LoRa gateway coordinates with upper computer software, allowing the upper computer software to exchange data with the LoRa gateway through a wired network.

A barcode is attached to the emergency light, showing a media access control (MAC) address of the wireless communication module inside the emergency light; the MAC address of the wireless communication module is acquired by scanning the barcode on the emergency light through a mobile application (App); mounting location information of the emergency light is input, saved or sent to an email box, and is imported through the upper computer software; and thus, management of the MAC address and the location information of the emergency light is achieved.

The light source assembly includes a lampshade, an LED light source module, and a heat sink; and the heat sink and the lampshade are coordinated with the LED light source module.

A power input of the AC control device is achieved through two pins of a lamp cap at one end of the power input interface; and a power input of the emergency control device is achieved through two pins of a lamp cap at the other end of the power input interface.

The LED emergency light is a light tube with an emergency function, a panel light with the emergency function, a grille light with the emergency function, a strip light with the emergency function, a ceiling light with the emergency function, or a fire emergency light.

The present disclosure has the following beneficial effects. The present disclosure designs a microcontroller circuit, a LoRa module circuit, and an auxiliary control board. The microcontroller circuit is provided with a pin controlled transistor circuit. During emergency testing, the output terminal of the AC control device and the LED load are disconnected, and the microcontroller circuit controls other components. The LoRa module circuit communicates wirelessly with the external LoRa gateway to receive a test instruction for real-time emergency function testing and upload the test result in real time. The auxiliary control board is provided with a test button, which achieves a manual testing function.

REFERENCE NUMERALS

1. AC control device;
2. light source assembly; 21. lampshade; 22. LED light source module; and 23. heat sink;
3. emergency control device;
4. battery;
5. auxiliary control board; 51. toggle switch; 52. indicator light; 53. button; and 54. antenna;
6. power input interface; and 61. lamp cap;
7. LoRa gateway;
81. constant-voltage drive circuit; 82. emergency operating circuit; 83. microcontroller circuit; 831. transistor circuit; and 84. LoRa module circuit; and
9. control computer.

DETAILED DESCRIPTION OF THE EMBODIMENTS

Figure 1:
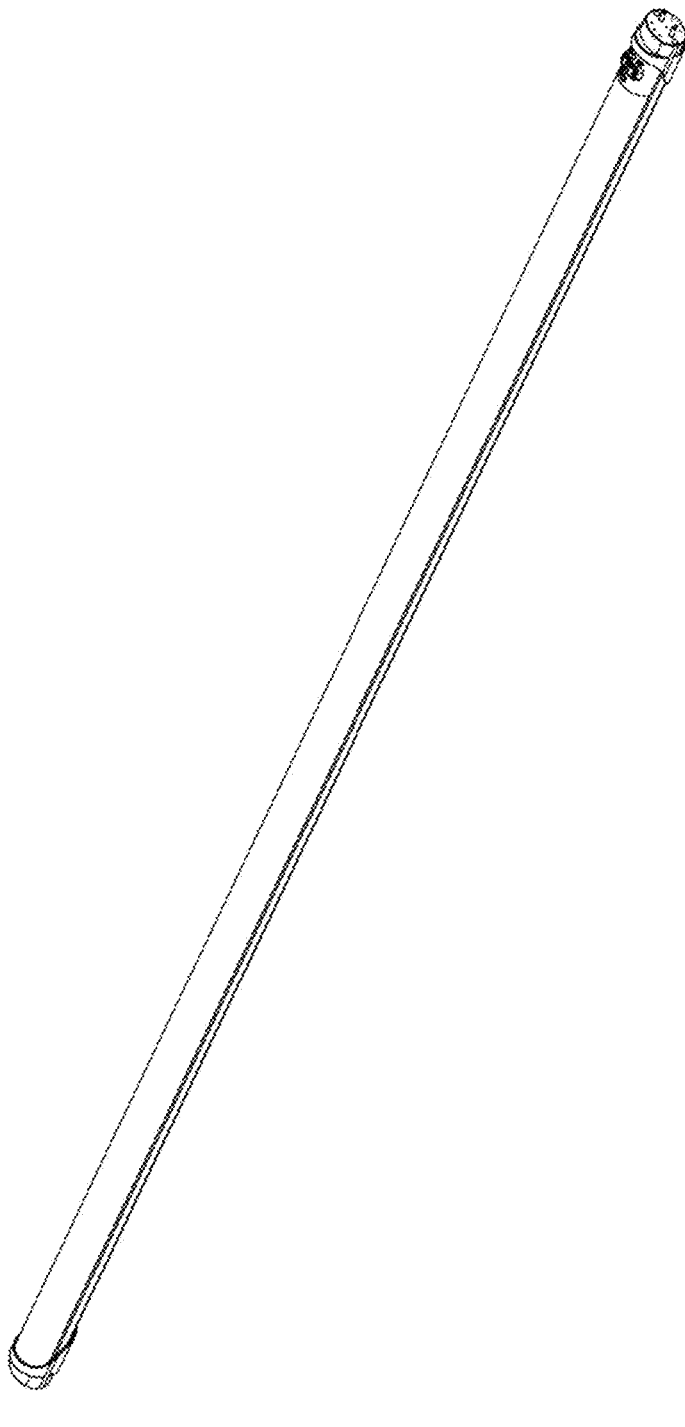
FIG. 1 is a schematic diagram of an emergency light.
Figure 2:
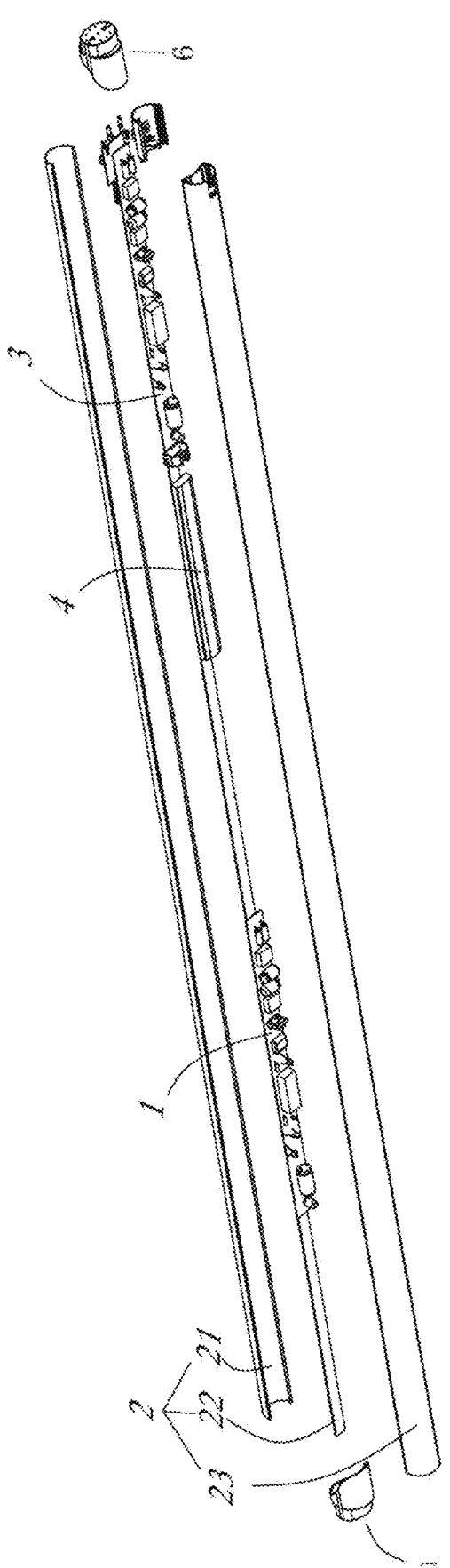
FIG. 2 is an exploded view of the emergency light shown in FIG. 1.
Figure 3:
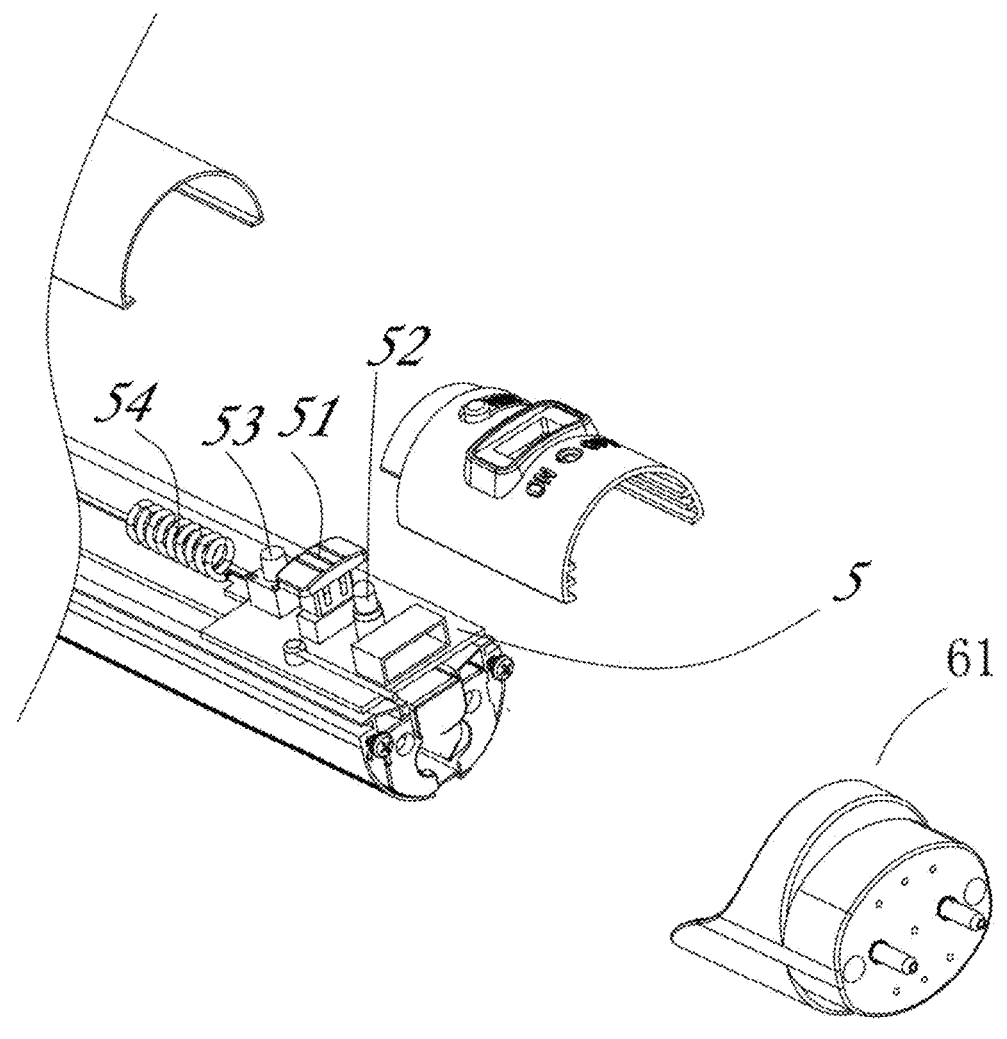
FIG. 3 is an exploded view of an end position of the emergency light shown in FIG. 1.
Figure 4:
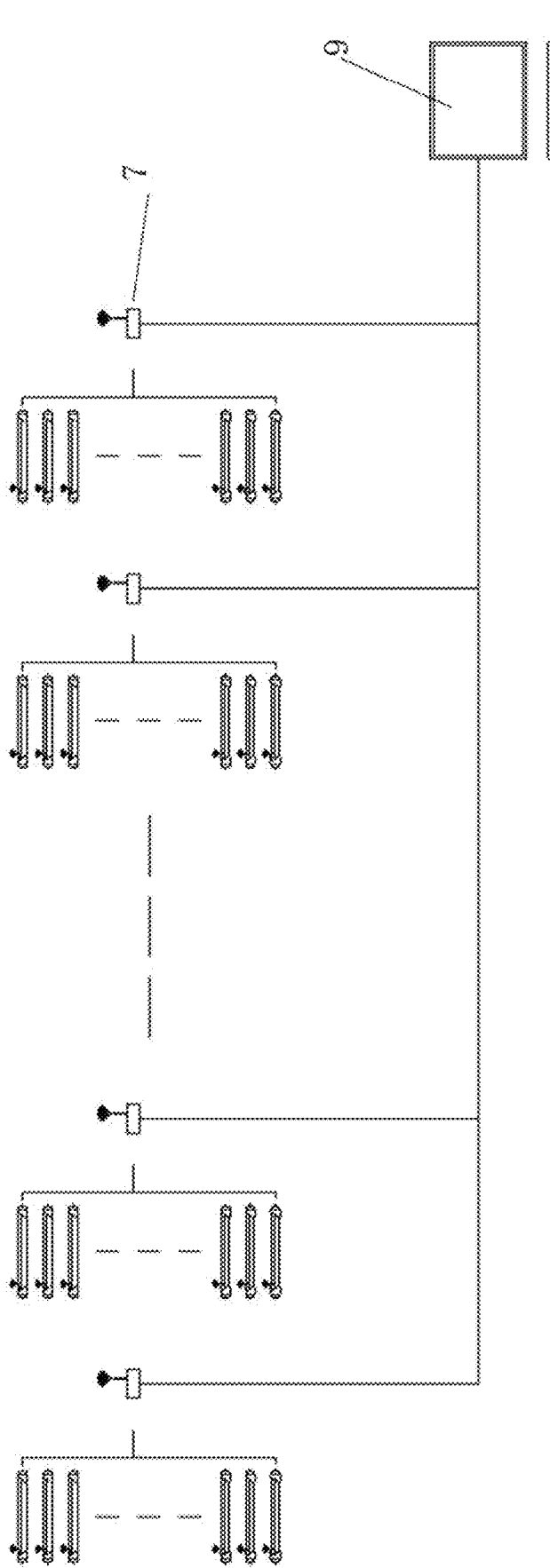
FIG. 4 is a schematic diagram showing that multiple emergency lights are coordinated with an upper computer through a LoRa gateway.
Figure 5:
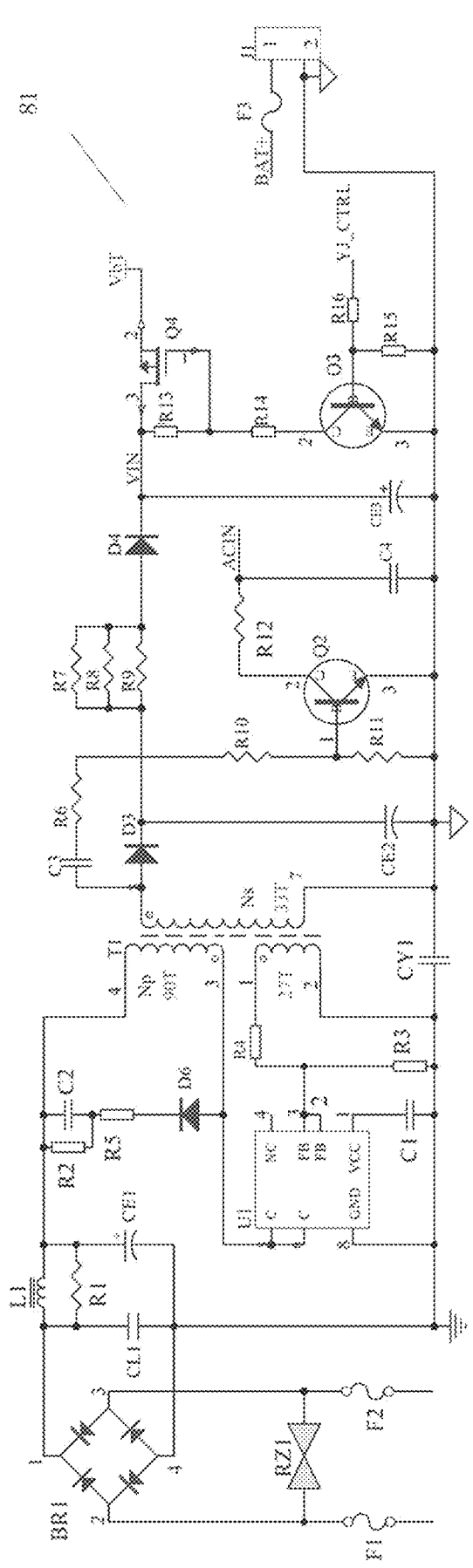
FIG. 5 is a schematic diagram of a constant-voltage drive circuit in an emergency control device.
Figure 6:
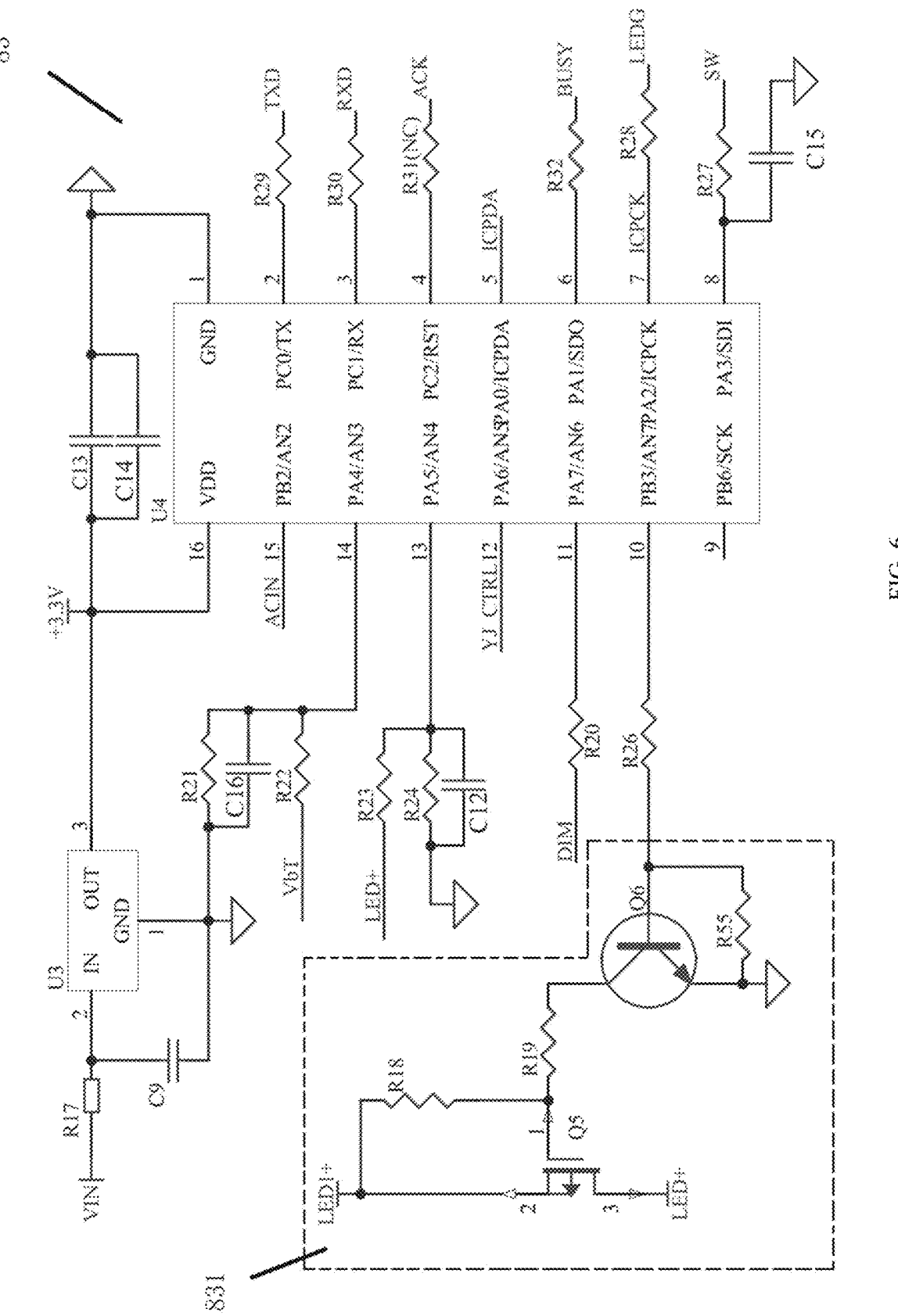
FIG. 6 is a schematic diagram of a microcontroller circuit in the emergency control device.
Figure 7:
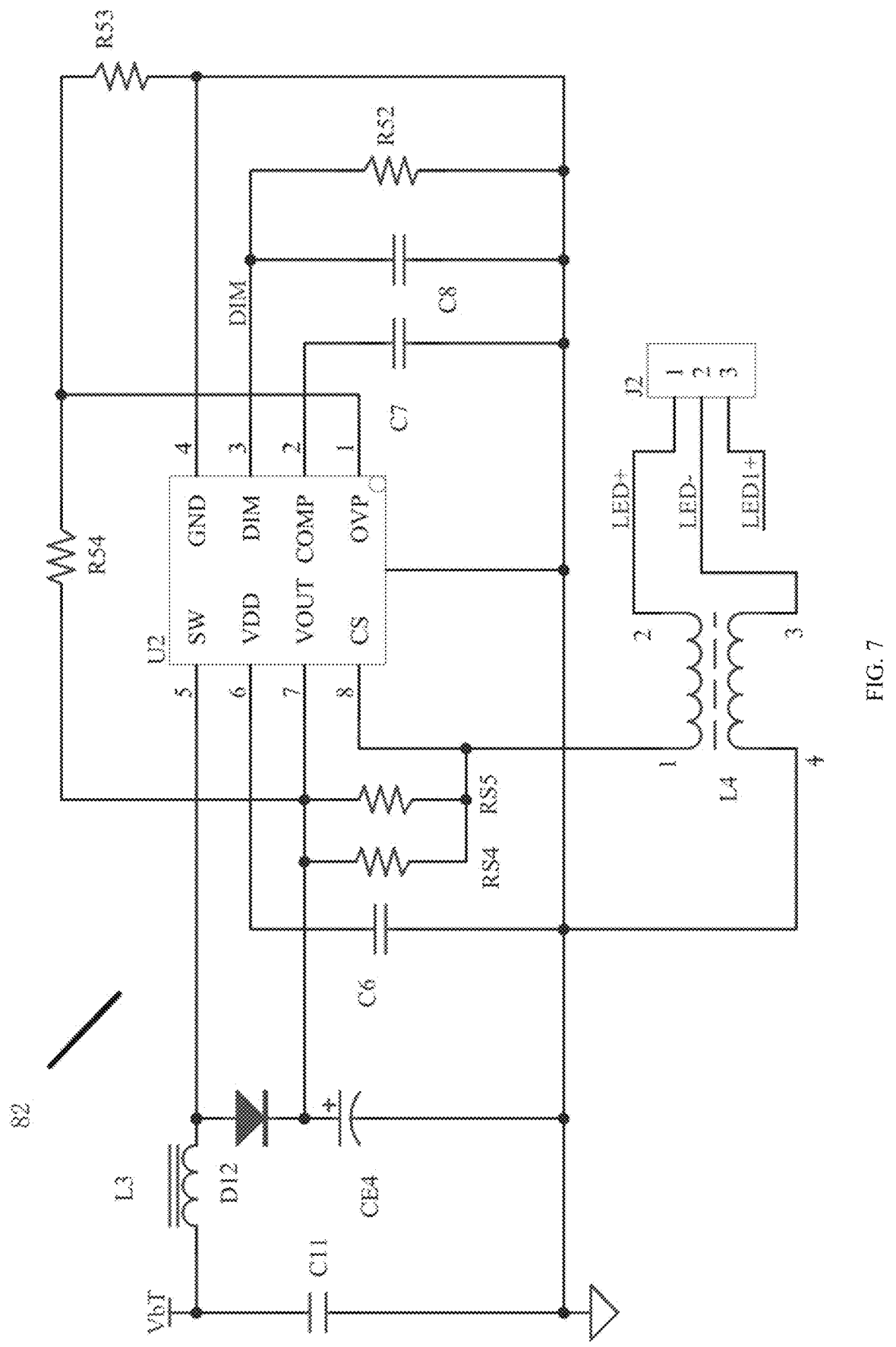
FIG. 7 is a schematic diagram of an emergency operating circuit in the emergency control device.
Figure 8:
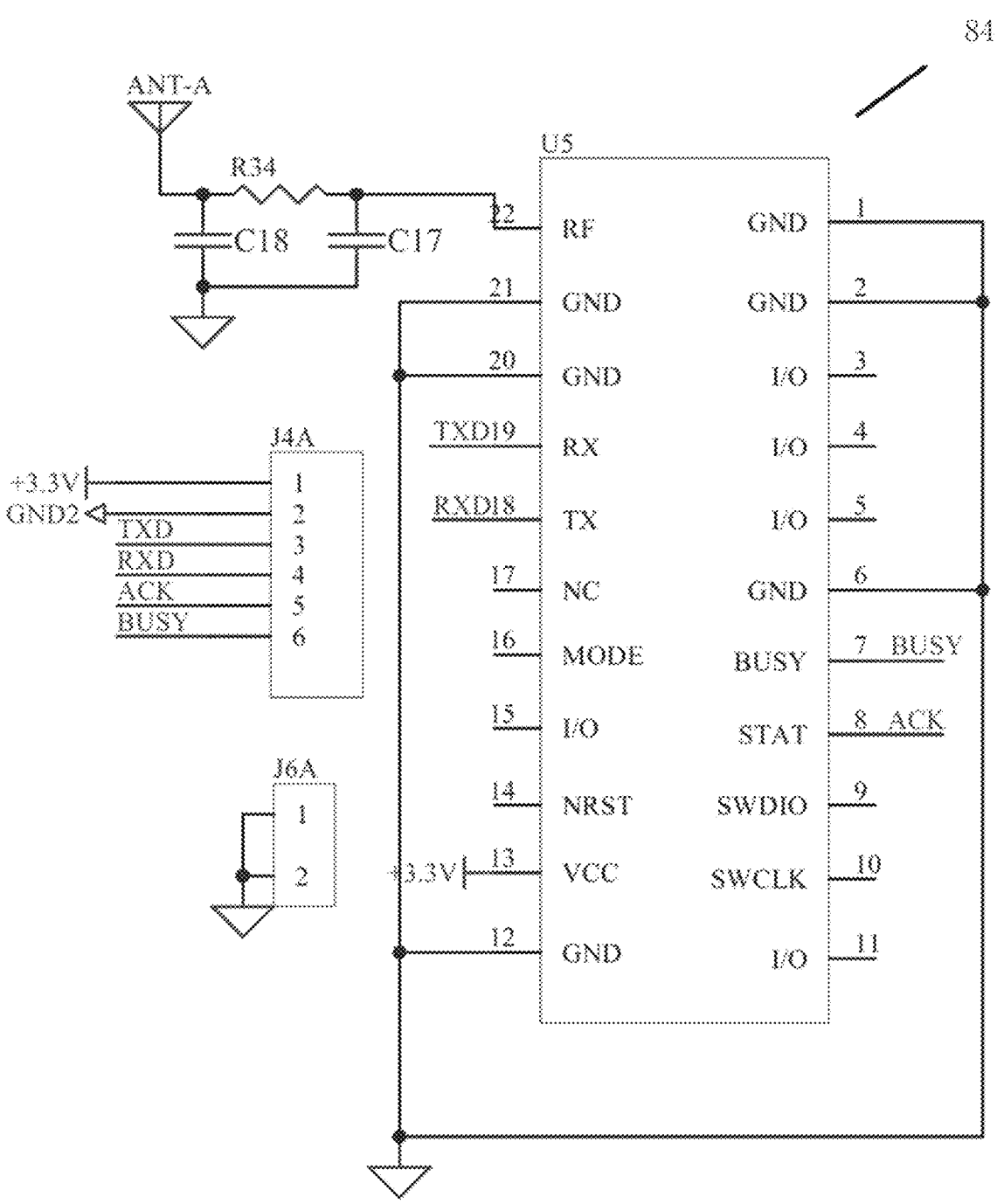
FIG. 8 is a schematic diagram of a LoRa module circuit in the emergency control device.
Figure 9:
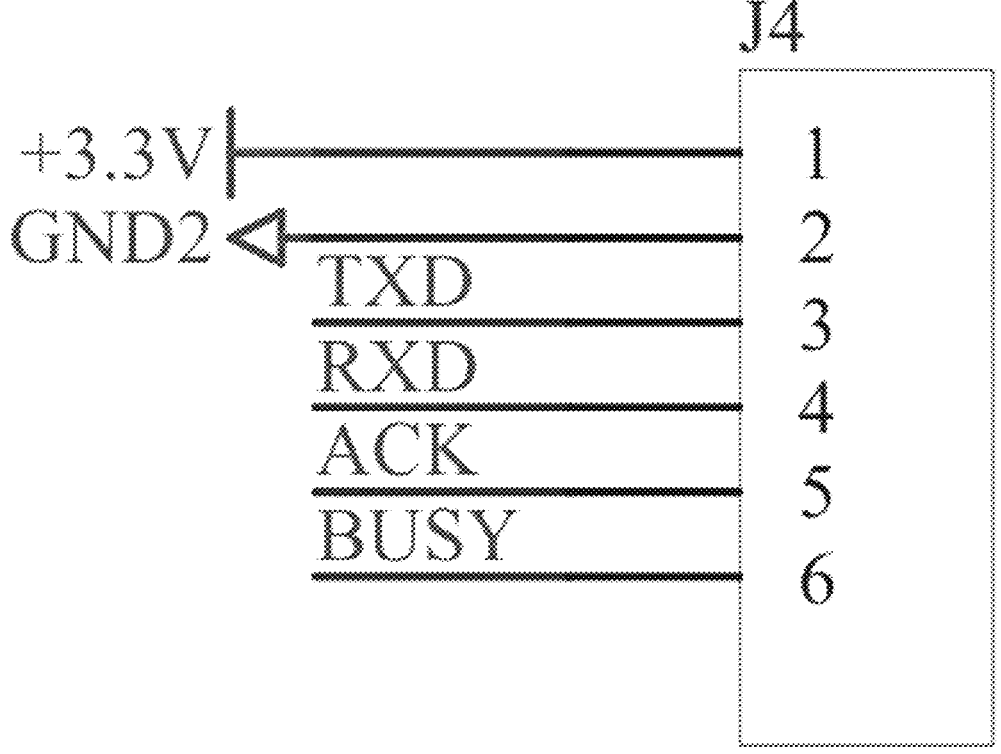
FIG. 9 is a schematic diagram of a LoRa interface of the LoRa module circuit.
Figure 10:
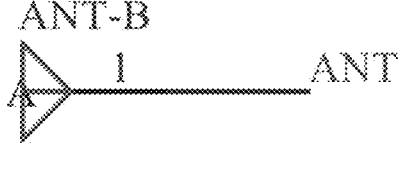
FIG. 10 is a schematic diagram of a circuit layout of an auxiliary control board.
Figure 10:
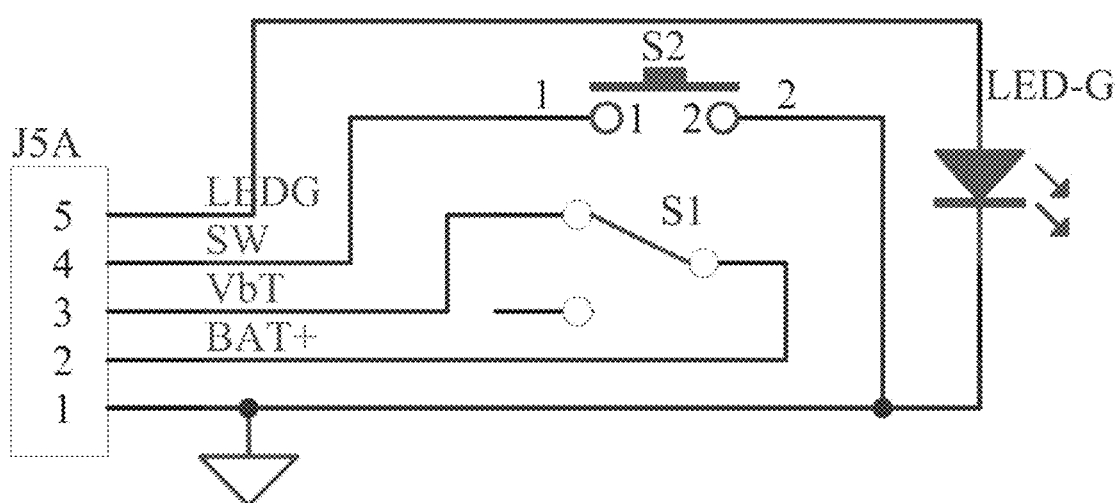

FIGS. 1 to 10 show a non-mobile indoor light-emitting diode (LED) emergency light in coordination with a long-range (LoRa) gateway. The LED emergency light includes alternating-current (AC) control device 1, light source assembly 2, emergency control device 3, battery 4, auxiliary control board 5, and power input interface 6. The AC control device 1 is configured to control the light source assembly 2 when a power grid is in a normal power supply state, and is equivalent to a driver for the light source assembly 2. The emergency control device 3 is configured to control the light source assembly 2 in an emergency state. The light source assembly 2 serves as a light-emitting component of the entire emergency light. The auxiliary control board 5 is configured to perform emergency detection and other tasks. The above components control a light tube to undergo an automatic emergency function test for 30 seconds once a month and/or 90 minutes once a year. They cut off the AC control device 1 in normal operation to output, and switch to the emergency control device 3 to supply power to an LED load. They detect an operating voltage of the LED and determine whether it enters emergency operation normally. They continuously detect a voltage of the battery 4 to determine if the voltage of the battery 4 meets a regulatory requirement. In practical applications, the quantity, shape, structure, and mutual coordination of the above components can be optimized and adjusted, or existing components can be used to replace the above components.

In the figure, the entire AC control device 1 adopts a conventional LED isolated constant-current driving power supply, which drives the LED load to work and light up during normal power supply. The power input of the AC control device 1 is achieved through two pins of lamp cap 61 at one end of the power input interface 6. The AC control device 1 can control the on/off of the light through a wall switch. As shown in the figure, transistor circuit 831 (FIG. 6), including transistor Q6 and transistor Q5 and controlled by pin 10 of chip U4, is provided between an output terminal of the AC control device 1 and the LED load. During emergency testing, the output terminal of the AC control device 1 is disconnected from the LED load. Please refer to the figure for the detailed circuit layout of the AC control device 1. In practical applications, another LED isolated constant-current driving power supply can be used to replace the above driving power supply. Correspondingly, the circuits of the transistor Q6 and the transistor Q5 can also be replaced by other circuits with equivalent functions.

The light source assembly 2 in the figure mainly serves as a light-emitting part of the light, and includes, for example, conventional lampshade 21, LED light source module 22, and heat sink 23. The lampshade 21 adopts a conventional transparent polycarbonate (PC) cover structure. The LED light source module 22 adopts structures such as an LED bead and an aluminum substrate. There are two lamp caps 61 forming the power input interface 6 of the light and located at two ends of the aluminum heat sink 23 of the light source assembly 2. Each lamp cap 61 is provided with two pins. The lampshade 21 is provided on the aluminum heat sink 23 of the light source assembly 2. The AC control device 1, the emergency control device 3, the battery 4, and the auxiliary control board 5 in the figure are all fixed to the light source assembly 2 in the manner shown in the figure. It should be noted that in other applications, such as other lights, the lamp cap 61 is not necessary, and the power input interface 6 can be replaced with a component that can serve as a power input terminal. In practical applications, other existing components can also be used to replace or optimize the above components.

The power input of the emergency control device 3 in the figure is achieved through two pins of lamp cap 61 at the other end of the power input interface 6. The emergency control device 3 is configured to charge the battery 4 during normal power supply and control the battery 4 to supply power such that the LED load continues operating in case of power failure. An operating power of the LED load during power failure is lower than a power of the LED load during normal power supply. The emergency control device 3 is provided with constant-voltage drive circuit 81, emergency operating circuit 82, microcontroller circuit 83, and LoRa module circuit 84. Please refer to the figure for the specific circuit layout.

The constant-voltage drive circuit 81 adopts a conventional circuit scheme structure, and is configured to charge the battery 4 and provide power to a microcontroller or chip in the microcontroller circuit 83 and the LoRa module circuit 84 during normal power supply. The emergency operating circuit 82 is powered by the battery 4 to operate. Based on the existing circuit scheme, the microcontroller of the microcontroller circuit 83 controls pin 10 to output a high level to pin DIM of the chip of the emergency operating circuit 82, allowing the LED load of the light source assembly 2 to work in the emergency state.

For the microcontroller circuit 83, during normal power supply, the constant-voltage drive circuit 81 outputs a voltage, and a voltage regulator chip of the microcontroller circuit outputs a 3.3 V voltage for power supply. During emergency operation, the battery 4 generates a 3.3 V voltage through the voltage regulator chip of the microcontroller circuit for power supply. Among input/output (I/O) pins of the chip of the microcontroller circuit 83, pins 2 and 3 are respectively data transmission and reception pins TXD and RXD of a serial interface. They are connected to pins RXD and TXD of the LoRa module circuit 84, achieving transparent data transmission with the LoRa module circuit 84. Pin 7 serves as a control pin for indicator light 52, and is connected to the indicator light 52 of the auxiliary control board 5. An I/O pin of the microcontroller outputs signals, causing the LED indicator light 52 to display different operating states. Pin 8 serves as a trigger pin for test button 53, and is connected to the test button 53 of the auxiliary control board 5. The I/O pin of the microcontroller receives a trigger signal from the test button 53. During normal power supply, pin 10 of the chip of the microcontroller circuit 83 outputs a high level to a base of the transistor Q6, causing the transistor Q6 to be on. The AC control device 1 outputs voltage LED1+, which is applied to a gate and a source of the transistor Q5, and is lost through voltage division by R18, causing the transistor Q5 to be on. The AC control device 1 outputs a voltage, which is applied to the LED load LED+, causing the LED load to operate normally. During emergency testing, this pin outputs a low level to the base of the transistor Q6, causing the transistor Q6 to be off. The AC control device 1 outputs voltage LED1+, which is applied to the gate and the source of the transistor Q5, and is lost due to voltage division by R18, causing the transistor Q5 to be off. A voltage output by the AC control device 1 is disconnected from the LED load LED+. Pin 11 serves as an emergency operation control pin. In an emergency operation mode, the I/O pin outputs a high level to the pin DIM of an emergency control circuit chip, such that the emergency operating circuit 82 operates, causing the LED load to light up and enter the emergency operation mode. During normal power supply, pin 12 of the chip of the microcontroller circuit 83, as an emergency control pin, outputs a high level to the base of the transistor Q3, causing the transistor Q3 to be on. The constant-voltage drive circuit outputs a voltage, which is applied to a gate and a source of the transistor Q4 through voltage division by R13, causing the transistor Q4 to be on. The constant-voltage drive circuit outputs a voltage to charge the battery. When the battery 4 is charged to a certain value, the emergency control pin 12 outputs a low level to the base of the transistor Q3, causing the transistor Q3 to be off. The voltage output by the constant-voltage drive circuit to the gate and the source of the transistor Q4 is lost through voltage division by R13, causing the transistor Q4 to be off. The operation that the constant-voltage drive circuit outputs a voltage to charge the battery 4 stops. Pin 13, as an LED load operating voltage detection pin, samples the voltage of the LED load through resistor division to acquire operating voltage information of the LED load as a basis for determining whether the emergency is operating normally. Pin 14 serves as a built-in voltage detection pin for the battery 4. The voltage of the battery 4 is sampled through resistor division to acquire voltage information of the battery 4 as a basis for determining whether emergency charging, emergency operation, and emergency testing conditions are met. Pin 15 serves as a normal power supply detection pin. During normal power supply, the emergency drive circuit operates and outputs a voltage, causing transistor Q2 to be on. The detection pin is pulled down to generate a low-level signal. The introduction of the above pins clearly shows the coordination between the chip and other circuits or components. Through the above configuration, the chip of the microcontroller circuit 83 can achieve monthly and annual automatic emergency function testing, with a 30-second emergency test once a month and a 90-minute emergency test once a year, to test whether the light can switch to emergency operation in case of power failure according to legal requirements.

The LoRa module circuit 84 acquires 3.3 V power supply through a circuit board and a connector, and performs transparent data transmission with the serial interface of the microcontroller circuit 83. The LoRa module circuit 84 is connected to spring antenna 54 on the auxiliary control board 5 through a communication line. The specific coordination can be implemented through an existing method in addition to a connector and a shielded wire to achieve electrical connection. The design can achieve LoRa wireless communication of data and instructions with the gateway and interactions of data and instructions with a user device, and conveniently provide users with fast ad hoc network access and wireless data services, etc. The specific communication protocol of the LoRa module circuit 84 can refer to existing technologies and technical standards. In order to facilitate the observation and data exchange of upper control computer 9, the LoRa module circuit 84 can communicate with an external device such as LoRa gateway 7 outside the light. The LoRa gateway 7 also includes a wireless communication module, a chip, and a data storage unit, corresponding to the communication module of the LoRa module circuit 84.

The LoRa gateway 7 communicates wirelessly with the emergency light to achieve data upload and download. The LoRa gateway 7 maintains cooperation with upper computer software, allowing the upper computer software to exchange data with the LoRa gateway 7 through a wired network. In practical applications, multiple LoRa module circuits 84 can be combined with one LoRa gateway 7. The coordination relationship between the LoRa module circuits 84 and the LoRa gateway 7 in terms of quantity is N:1, that is, multiple emergency lights are coordinated with one LoRa gateway 7, N≤200. The LoRa gateway 7 stores test result data and saves it to a database through the control computer 9 terminal. The LoRa module circuit 84 receives a 30-second or 90-minute emergency function testing instruction from the LoRa gateway 7 to perform real-time emergency function testing and upload the test result in real time. A barcode is attached to the emergency light, showing a media access control (MAC) address of the wireless communication module inside the emergency light. In this way, by scanning the barcode on the emergency light through a mobile application (App), the MAC address of the wireless communication module can be acquired. The mounting location information of the emergency light can be input and saved or sent to an email box. The data is imported through the upper computer software to manage the MAC address, the location information, and the test result of the emergency light.

The battery 4 in the figure is a conventional component that supplies power to the emergency control device 3 in an emergency state. The specifications of the battery 4 can be adjusted and optimized as needed.

The auxiliary control board 5 in the figure is fixed to a slot of the aluminum heat sink 23, such as an aluminum profile, and further fixed by the lamp cap 61. The auxiliary control board 5 is electrically connected to the emergency control device 3 through a set of electronic wiring harnesses. The auxiliary control board 5 is provided with toggle switch 51, indicator light 52, button 53, and antenna 54. The toggle switch 51 is coordinated with the battery 4 to disconnect and connect the battery 4. It is placed in an OFF position when leaving the factory, and needs to be placed in an ON position by the user before use. The indicator light 52 is configured to display the operating mode and automatic testing state of the emergency light, specifically as follows. a. When the indicator light is always on, it indicates normal power supply and normal testing. b. When the indicator light is off, it indicates a power failure. c. When the indicator light is in slow flash mode 1, on for 1 second/off for 0.3 seconds, lasting for 15 seconds, it indicates that the built-in battery 4 is not fully charged or not suitable for manual testing. d. When the indicator light is in slow flash mode 2, on for 1 second/off for 3 seconds, it indicates emergency testing under progress. e. When the indicator light is in a quick flash mode, on for 0.5 seconds/off for 0.5 seconds, it indicates abnormal testing. The button 53 is configured for emergency manual testing. Pressing the test button 53 once within 3 seconds requires the emergency light to perform a 30-second automatic emergency test. Pressing the test button 53 is pressed twice within 3 seconds requires the emergency light to perform a 90-minute automatic emergency test. During any manual testing process, pressing the test button 53 once will terminate the manual testing by the automatic testing control system. Pressing and holding the test button 53 for 5 seconds will make it reset, and the time of the automatic testing program time will be zero-set. The antenna 54 is the spring antenna 54 configured for signal transmission and reception of the LoRa module circuit 84. The antenna 54 can be soldered onto the control board close to a side of the lamp cap 61, below the lampshade 21. The antenna 54 is coordinated with the LoRa module circuit 84 through a shielded wire. One end of the shielded wire provided with a shielded terminal is fastened to a patch terminal on the emergency control device 3 and electrically provided with a receiving terminal of the antenna 54. The other end of the shielded wire not provided with a shielded terminal is soldered to the auxiliary control board 5 for electrical assembly with the antenna 54 on the auxiliary control board 5. Alternatively, the other end of the shielded wire provided with a shielded terminal is fastened to a patch terminal on the control board so as to electrically coordinate with the antenna 54 on the auxiliary control board 5.

The emergency light of the present disclosure is mainly used as a non-mobile indoor light. Specifically, it can be used as a light tube with an emergency function, a panel light with the emergency function, a grille light with the emergency function, a strip light with the emergency function, a ceiling light with the emergency function, or a fire emergency light.

The above specific embodiments are merely described to explain the present disclosure, rather than to limit the present disclosure. It should be noted that, in the description of the present disclosure, orientation or position relationships indicated by terms such as "upper" and "internal" are shown in the drawings. These terms are merely intended to facilitate and simplify the description of the present disclosure, rather than to indicate or imply that the mentioned device or elements must have a specific orientation and must be constructed and operated in a specific orientation. Therefore, these terms should not be understood as a limitation to the present disclosure.

Meanwhile, in the description of the present disclosure, it should be noted that unless otherwise clearly specified and limited, meanings of terms "fix" and "coordinate" should be understood in a broad sense. For example, the term "connection" may mean a fixed connection, a removable connection or an integrated connection. It may mean a direct connection or an indirect connection via an intermediate medium, and may be intercommunication or interaction between two components. Those of ordinary skill in the art may understand specific meanings of the above terms in the present disclosure based on specific situations.

Although the embodiments of the present disclosure are illustrated and described above, it should be understood that those of ordinary skill in the art may make various changes, modifications, replacements, and variations to these embodiments without departing from the principle and spirit of the present disclosure, and the scope of the present disclosure is limited by the appended claims and their equivalents.

The invention claimed is:

1. A non-mobile indoor light-emitting diode (LED) emergency light in coordination with a long-range (LoRa) gateway, comprising an alternating-current (AC) control device, an emergency control device, a light source assembly, a battery, an auxiliary control board, and a power input interface, wherein a transistor circuit controlled by a pin 10 of a chip of a microcontroller circuit is provided between an output terminal of the AC control device and an LED load;

during emergency testing, the output terminal of the AC control device is disconnected from the LED load; the AC control device, the emergency control device, the battery, and the auxiliary control board are all configured with the light source assembly; the emergency control device is provided with a constant-voltage drive circuit, an emergency operating circuit, the microcontroller circuit, and a LoRa module circuit; the constant-voltage drive circuit is configured to charge the battery and provide power to a microcontroller in the microcontroller circuit and the LoRa module circuit during normal power supply; the emergency operating circuit is powered by the battery to operate; the microcontroller of the microcontroller circuit is configured to control a pin 11 to output a high level to a pin DIM of a chip of the emergency operating circuit, allowing the LED load of a light source to operate in an emergency state; when the microcontroller circuit is under normal power supply, the constant-voltage drive circuit outputs a voltage, and a voltage regulator chip of the microcontroller circuit outputs a 3.3 V voltage for power supply; during emergency operation, the battery generates a 3.3 V voltage through the voltage regulator chip of the microcontroller circuit for power supply; among pins used by the microcontroller of the microcontroller circuit, two pins VDD and GND serve as 3.3 V power supply pins for the microcontroller; two pins 2 and 3, as data transmission and reception pins TXD and RXD of a serial interface, are respectively connected to pins RXD and TXD of the LoRa module circuit, achieving transparent data transmission with the LoRa module circuit; a pin 7 serves as a control pin for an indicator light, and is connected to the indicator light of the auxiliary control board; an input/output (I/O) pin 7 of the microcontroller is configured to output signals, causing the indicator light to display different operating states; a pin 8 serves as a trigger pin for a test button, and is connected to the test button of the auxiliary control board; the I/O pin 8 of the microcontroller is configured to receive a trigger signal from the test button; a pin 10 is configured to connect or disconnect the output terminal of the AC control device and the LED load; during normal power supply, the pin 10 outputs a high level to a base of a transistor Q6, causing the transistor Q6 to be on; a voltage LED1+ output by the AC control device is applied to a gate and a source of a transistor Q5 through voltage division by R18, causing the transistor Q5 to be on; a voltage output by the AC control device is applied to the LED load LED+, causing the LED load to operate normally; during emergency testing, the pin 10 outputs a low level to the base of the transistor Q6, causing the transistor Q6 to be off; the voltage LED1+ output by the AC control device to the gate and the source of the transistor Q5 is lost through voltage division by R18, causing the transistor Q5 to be off; a voltage output by the AC control device is disconnected from the LED load LED+; a pin 11 serves as an emergency operation control pin; in an emergency operation mode, the I/O pin 11 outputs a high level to a pin DIM of an emergency control circuit chip, such that the emergency operating circuit operates, causing the LED load to light up and enter the emergency operation mode; a pin 12 serves as a charging control pin for the battery; during normal power supply, the pin 12 outputs a high level to a base of a transistor Q3, causing the transistor Q3 to be on; a voltage output by the constant-voltage drive circuit is applied to a gate and a source of a transistor Q4 through voltage division by R13, causing the transistor Q4 to be on; the constant-voltage drive circuit outputs a voltage to charge the battery; when the battery is charged to a certain value, the pin 12 outputs a low level to the base of the transistor Q3, causing the transistor Q3 to be off; the voltage output by the constant-voltage drive circuit to the gate and the source of the transistor Q4 is lost through voltage division by R13, causing the transistor Q4 to be off, such that the charging of the battery by the voltage output by the constant-voltage drive circuit stops; a pin 14 serves as a voltage detection pin for the battery, and acquires voltage information of the battery through resistor division sampling on a voltage of the battery as a basis for determining whether emergency charging, emergency operation, and emergency testing conditions are met; a pin 15 serves as a normal power supply detection pin; during normal power supply, the emergency drive circuit operates and outputs a voltage, causing a transistor Q2 to be on; the normal power supply detection pin 15 is pulled down to generate a low-level signal; the LoRa module circuit performs transparent data transmission with the serial interface of the microcontroller circuit; the LoRa module circuit is connected to a spring antenna on the auxiliary control board through a communication line to achieve LoRa wireless communication of data and instructions with the LoRa gateway; the auxiliary control board is provided with a toggle switch, the indicator light, the test button, and the spring antenna; the toggle switch is coordinated with the battery to disconnect and connect the battery; the indicator light is configured to display an operating mode and an automatic testing state of the non-mobile indoor LED emergency light; the test button is configured for emergency manual testing; when the test button is pressed several times within set seconds, the non-mobile indoor LED emergency light performs set seconds of automatic emergency testing; when the test button is pressed several times within set seconds, the non-mobile indoor LED emergency light performs set minutes of automatic emergency testing; during any manual testing process, when the test button is pressed several times, an automatic testing control system terminates manual testing; and when the test button is pressed and held for set seconds for reset, timing of an automatic testing program is reset to zero.

2. The non-mobile indoor LED emergency light in coordination with the LoRa gateway according to claim 1, wherein a coordination relationship between the LoRa module circuit and the LoRa gateway in terms of quantity is N:1, N≤200.

3. The non-mobile indoor LED emergency light in coordination with the LoRa gateway according to claim 2, wherein when the test button is pressed once within 3 seconds, the non-mobile indoor LED emergency light performs 30 seconds of automatic emergency testing; when the test button is pressed twice within 3 seconds, the non-mobile indoor LED emergency light performs 90 minutes of automatic emergency testing; during any manual testing process, when the test button is pressed once, the automatic testing control system terminates manual testing; and when the test button is pressed and held for 5 seconds for reset, timing of the automatic testing program is reset to zero.

4. The non-mobile indoor LED emergency light in coordination with the LoRa gateway according to claim 3, wherein the LoRa gateway stores test result information, and saves the test result information to a database through a computer terminal; and the LoRa module circuit receives a 30-second or 90-minute emergency function testing instruction from the LoRa gateway, performs real-time emergency function testing, and uploads a test result in real time.

5. The non-mobile indoor LED emergency light in coordination with the LoRa gateway according to claim 4, wherein the indicator light is configured to display the operating mode and the automatic testing state of the non-mobile indoor LED emergency light, wherein:

a. when the indicator light is always on, the indicator light indicates normal power supply and normal testing;

b. when the indicator light is off, the indicator light indicates a power failure;

c. when the indicator light is in a slow flash mode 1, on for 1 second/off for 0.3 seconds, lasting for 15 seconds, the indicator light indicates that the battery is not fully charged or not suitable for manual testing;

d. when the indicator light is in a slow flash mode 2, on for 1 second/off for 3 seconds, the indicator light indicates emergency testing under progress; and e. when the indicator light is in a quick flash mode, on for 0.5 seconds/off for 0.5 seconds, the indicator light indicates abnormal testing.

6. The non-mobile indoor LED emergency light in coordination with the LoRa gateway according to claim 5, wherein the spring antenna is configured for signal transmission and reception of the LoRa module circuit.

7. The non-mobile indoor LED emergency light in coordination with the LoRa gateway according to claim 6, wherein the light source assembly comprises a lampshade, an LED light source module, and a heat sink; and the heat sink and the lampshade are coordinated with the LED light source module.

8. The non-mobile indoor LED emergency light in coordination with the LoRa gateway according to claim 2, wherein the light source assembly comprises a lampshade, an LED light source module, and a heat sink; and the heat sink and the lampshade are coordinated with the LED light source module.

9. The non-mobile indoor LED emergency light in coordination with the LoRa gateway according to claim 3, wherein the light source assembly comprises a lampshade, an LED light source module, and a heat sink; and the heat sink and the lampshade are coordinated with the LED light source module.

10. The non-mobile indoor LED emergency light in coordination with the LoRa gateway according to claim 4, wherein the light source assembly comprises a lampshade, an LED light source module, and a heat sink; and the heat sink and the lampshade are coordinated with the LED light source module.

11. The non-mobile indoor LED emergency light in coordination with the LoRa gateway according to claim 5, wherein the light source assembly comprises a lampshade, an LED light source module, and a heat sink; and the heat sink and the lampshade are coordinated with the LED light source module.

12. The non-mobile indoor LED emergency light in coordination with the LoRa gateway according to claim 1, wherein the transistor circuit is controlled by a pin 10 of the microcontroller of the microcontroller circuit; and an I/O pin 11 is configured to output a high level to the pin DIM of the emergency control circuit chip.

13. The non-mobile indoor LED emergency light in coordination with the LoRa gateway according to claim 12, wherein the LoRa gateway comprises a wireless communication module, a chip, and a data storage unit; the wireless communication module corresponds to the LoRa module circuit; the LoRa gateway communicates wirelessly with the non-mobile indoor LED emergency light to achieve data upload and download; and the LoRa gateway coordinates with upper computer software, allowing the upper computer software to exchange data with the LoRa gateway through a wired network.

14. The non-mobile indoor LED emergency light in coordination with the LoRa gateway according to claim 13, wherein a barcode is attached to the non-mobile indoor LED emergency light, showing a media access control (MAC) address of the wireless communication module inside the non-mobile indoor LED emergency light; the MAC address of the wireless communication module is acquired by scanning the barcode on the non-mobile indoor LED emergency light through a mobile application (App); mounting location information of the non-mobile indoor LED emergency light is input, saved or sent to an email box, and is imported through the upper computer software; and thus, management of the MAC address and the mounting location information of the non-mobile indoor LED emergency light is achieved.

15. The non-mobile indoor LED emergency light in coordination with the LoRa gateway according to claim 14, wherein the light source assembly comprises a lampshade, an LED light source module, and a heat sink; and the heat sink and the lampshade are coordinated with the LED light source module.

16. The non-mobile indoor LED emergency light in coordination with the LoRa gateway according to claim 12, wherein the light source assembly comprises a lampshade, an LED light source module, and a heat sink; and the heat sink and the lampshade are coordinated with the LED light source module.

17. The non-mobile indoor LED emergency light in coordination with the LoRa gateway according to claim 13, wherein the light source assembly comprises a lampshade, an LED light source module, and a heat sink; and the heat sink and the lampshade are coordinated with the LED light source module.

18. The non-mobile indoor LED emergency light in coordination with the LoRa gateway according to claim 1, wherein the light source assembly comprises a lampshade, an LED light source module, and a heat sink; and the heat sink and the lampshade are coordinated with the LED light source module.

19. The non-mobile indoor LED emergency light in coordination with the LoRa gateway according to claim 18, wherein a power input of the AC control device is achieved through two pins of a first lamp cap at a first end of the power input interface; and a power input of the emergency control device is achieved through two pins of a second lamp cap at a second end of the power input interface.

20. The non-mobile indoor LED emergency light in coordination with the LoRa gateway according to claim 1, wherein the non-mobile indoor LED emergency light is a light tube with an emergency function, a panel light with the emergency function, a grille light with the emergency function, a strip light with the emergency function, a ceiling light with the emergency function, or a fire emergency light.

\* \* \* \* \*